Nov. 13, 1928.　　　　　　　　　　　　　　　　　　　　1,691,196
B. JIROTKA
APPARATUS FOR PRODUCING HARD HOMOGENEOUS FUEL OR SIMILAR OBJECTS
FROM PEAT, PEAT MOSS, LIGNITE, OR THE LIKE
Original Filed May 29, 1926　　2 Sheets-Sheet 1

INVENTOR
B. Jirotka
by Langner, Parry, Card and Langner Att'ys.

Nov. 13, 1928.  1,691,196
B. JIROTKA
APPARATUS FOR PRODUCING HARD HOMOGENEOUS FUEL OR SIMILAR OBJECTS
FROM PEAT, PEAT MOSS, LIGNITE, OR THE LIKE
Original Filed May 29, 1926    2 Sheets-Sheet 2

INVENTOR
B. Jirotka
by
Langner, Parry, Card and Langner Attys.

Patented Nov. 13, 1928.

1,691,196

UNITED STATES PATENT OFFICE.

BOHUMIL JIROTKA, OF BERLIN, GERMANY, ASSIGNOR TO THE FIRM DR. OTTO SPRENGER, PATENTVERWERTUNG JIROTKA MIT BESCHRÄNKTER HAFTUNG, OF VADUZ, LICHTENSTEIN.

APPARATUS FOR PRODUCING HARD HOMOGENEOUS FUEL OR SIMILAR OBJECTS FROM PEAT, PEAT MOSS, LIGNITE, OR THE LIKE.

Original application filed May 29, 1926, Serial No. 112,536, and in Germany August 13, 1921. Divided and this application filed February 11, 1927. Serial No. 167,508.

This invention relates to apparatus for producing hard homogeneous fuel or similar objects from peat, peat-moss, lignite or the like according to the process described and claimed in my co-pending application, Serial No. 112,536, filed May 29, 1926, of which former application the present is a division.

In the accompanying drawings several modifications of the devices used for carrying out the process referred to are represented, in which:—

Figure 1:
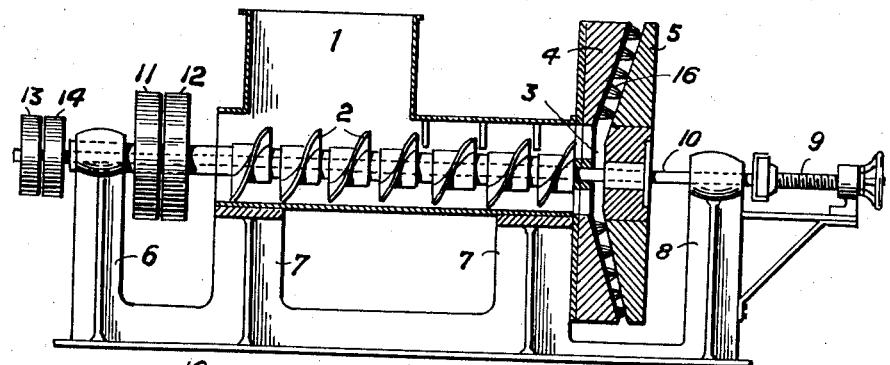

Fig. 1 is a worm-feed press with grinding device attached, shown in longitudinal section and partly in elevation.

Figure 2:
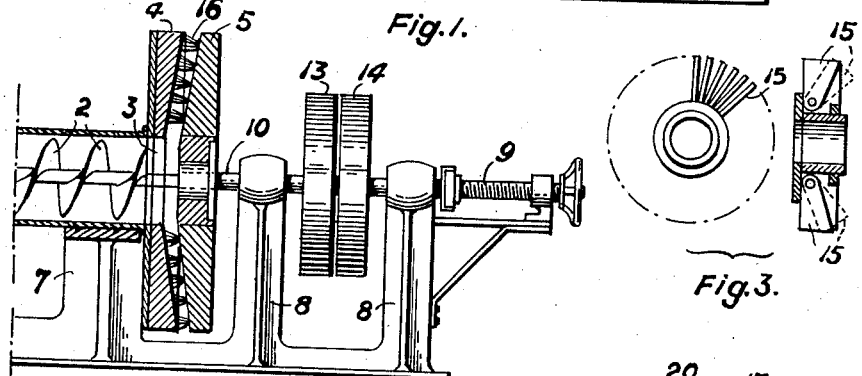

Fig. 2 a somewhat modified construction of Fig. 1.

Figure 3:
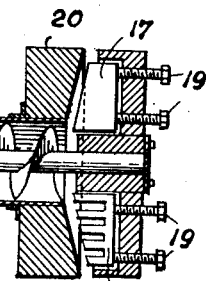
Figures 4, 5:
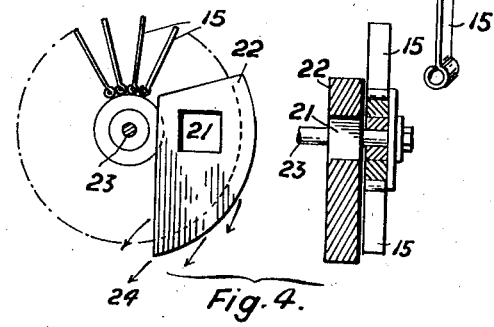

Figs 3–5 show various constructional forms of the grinding device.

Figure 7:
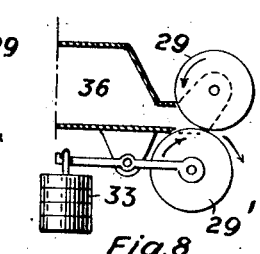
Figure 8:
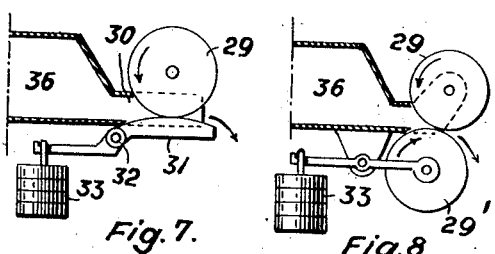
Figure 6:
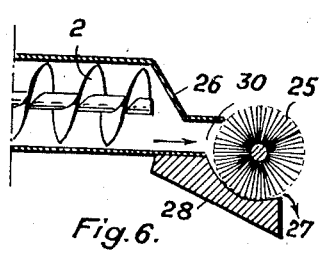

Figs. 6–8 three other constructional forms of the device according to Fig. 1.

Figs. 9–14 various constructional forms of the grinding device.

Referring to Figs. 1 and 2, 1 is a hopper by means of which the material is fed to the worm 2. By the rotation of the latter the material is fed to a grinding device, and is fed or pressed into the space 3 between the grinding members 4 and 5 of the grinding device. As the grinding member 5 rotates the material collected in the space 3 is pushed continually outwards through centrifugal force, so that it undergoes a very fine trituration. 6, 7 and 8 are supports, 9 an adjusting-screw for the shaft 10, that is, for the grinding or rubbing members 4 and 5. 11 and 12 are fast-and-loose pulleys for driving the worm. 13 and 14 is the drive for the rotatable grinding member 5.

In Fig. 2 the drive 13, 14 for the rotatable grinding-member 5 is located behind the worm 2.

The grinding members 4 and 5 consist preferably of coarse emery, steel brushes 16, (Figs. 1 and 2) or of blades or segments 15 (Figs. 3 and 4). The blades or segments 15 are so arranged, that as a result of the centrifugal force developed by rotation, they run very close to the grinding member 4, whereby they break up or crush the material fed between the stones 4 and 5.

Fig. 4 shows a grinding device located in front of the delivery nozzle 21 of a press. Upon the nozzle 21 a disc 22 consisting of coarse emery or metal is so arranged that the segments 15 rotating round the axle 23 cut up the material. As a result of centrifugal force the finely cut material is ground on the disc 22 and moved progressively outwards, so that eventually it is flung out in the direction of the arrow 24.

The grinding devices can also be mounted upon discs and may consist of steel plates 17, 18 of smooth or comb-like shape (Fig. 5); they can be adjusted at will by means of the screws 19. Such grinding members have the advantage that they keep themselves sharp by use, since they consist of thin material, preferably sheet steel. The fixed disc of the grinder is marked 20 in Fig. 5.

Fig. 6 shows a cylindrical grinding member 25 in front of the delivery nozzle 26 of a worm-feed press 2. This grinding member 25 may be of hard, that is to say, sharpening material, for instance, of emery, of suitable stone or even of steel brushes. The press 2 feeds the material in the direction of the arrow 30 against the circumference of the cylinder 25, by which since it rotates at a high speed, the material is carried along and flung out in the direction of the arrow 27. The abutment 28 of stone or metal is suitably adjustable.

Fig. 7 shows also the use of a cylindrical grinding member 29 which may be provided with steel brushes. This latter is so built into the restricted portion 30 of the delivery channel 36 of a press, that it forces and breaks up the material against the grinding cheek 31. The grinding cheek 31 is pivotally mounted at 32 and rendered yielding by means of a weight 33 or a spring. If extraneous bodies, which the roller cannot crush are introduced, this cheek 31 yields by the weight 33 being raised, and the extraneous body is flung out.

In Fig. 8 a device, similar to that in Fig. 7, is shown, only here the under cheek also, consists of a cylinder 29', which rotates more slowly than the other cylinder 29, so that between the two cylinders, on account of their different peripheral speeds, a rubbing, that is to say, a grinding process takes place.

These cylindrical grinding-members can also be so built into a press, that they press out the material ground by them through a nozzle in strip form, in which case members are provided to clean off the material which may cling to the cylinders.

Figure 9:
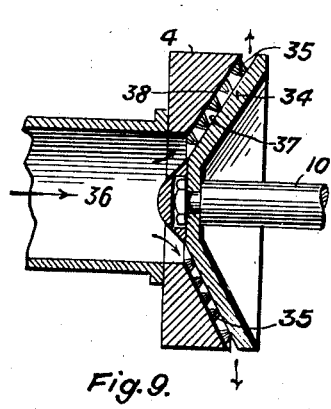

Fig. 9 shows a similar arrangement to Fig. 1. If the disc 34 is set in rotation by the shaft 10, the material, which is fed from the direction of the arrow 36, is introduced into the space between the two surfaces 37—38 and there drawn by the wire brushes 35 over the fixed surface 38 until it is flung out at the periphery of the disc. During this long grinding process the colloids are dispersed on account of the pressure, the heat and the continual working of the mass by the wire brushes 35, so that the mass on delivery very quickly yields up the water contained therein and dries hard.

Figure 10:
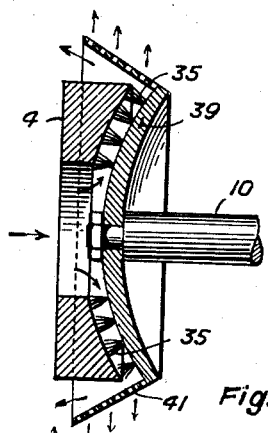

Fig. 10 is similar to Fig. 9, except that the conical stone 34 of Fig. 9 is replaced by a lenticular disc 39, upon the rim of which a perforated frame 41 of thin sheet-metal or cloth or the like is located. The plastic mass slips on the conical surface towards the rim and the water, which can pass easily through the perforated sieve or the cloth, is flung out by centrifugal force in the direction of the arrows at right-angles to the shaft 10. In this way the mass leaves the machine, for the most part, free of water.

Figure 11:
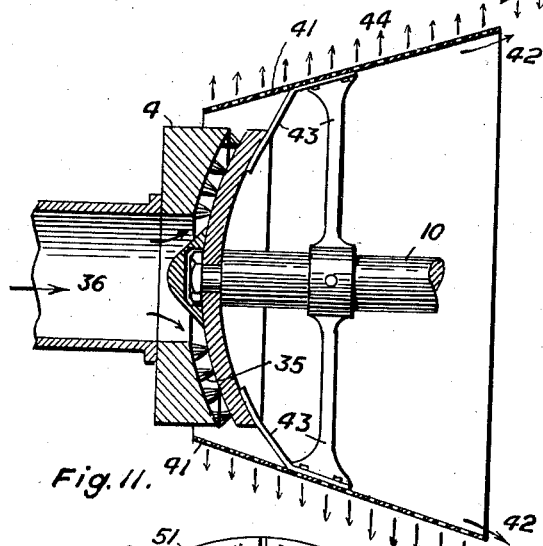

In Fig. 11 this surrounding frame 41 has a different form to that in Fig. 10. The water passes out in the direction of the arrows 44, and the mass carried along by the supports 43, leaves the device in the direction of the arrows 42.

Figure 12:
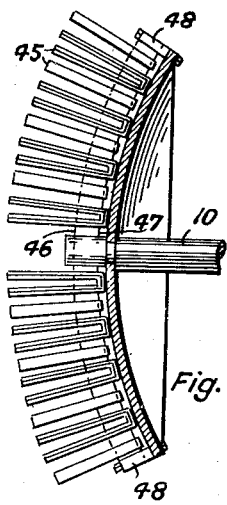
Figure 13:
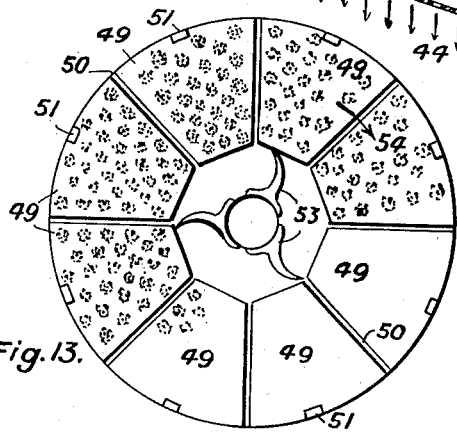
Figure 14:
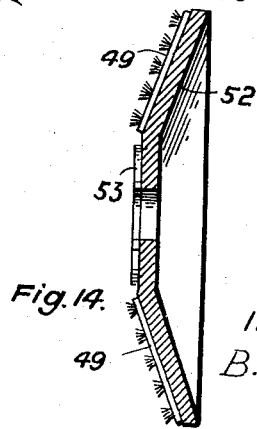

The grinding members can rotate either vertically or horizontally and the shape of the perforated surfaces 41 can be as desired, for example, round, angular, cylindrical, funnel-shaped, or vat-shaped etc. Figs. 12, 13 and 14 show, by way of example, several constructional forms of the grinding discs. In Fig. 12 the wire brushes consist of flat steel strips 45, bent in the shape of a U. 46 and 47 are lenticular sheet-metal discs adjusted to the curve of the grind-stone, provided with perforations, for example, quadrangular holes, and held together by bolts 48. The flat brushes 45 bent in the shape of a U, are so provided that according to the nature of their employment they can be used either flat or on edge. They can, however, also be arranged alternately flat or edge up as in Fig. 12.

Figs. 13 and 14 show a grinding disc 52 with segment-like brushes 49. These brushes may be of wood, metal or other suitable material, and can be attached to the disc by means of angular, or T pieces 50. They can be secured against flying out owing to centrifugal force, by means of locking-members 51, and they can also be screwed on to the disc 52. Spade-like dividers for the material fed in are marked 53. The direction of rotation of the disc is shown by the arrow 54. (Fig. 13).

In addition to peat and peat-moss, lignite, which usually contains a considerable quantity of water, may be made to give up its water more quickly than would otherwise be the case, by means of the fine grinding, rubbing and heating and the continual working which takes place in the grinding members as provided by the present invention. For the acceleration of the final process, that is, the drying, steam or hot air can be introduced between the grinding members, or the latter can be heated electrically or with gas, steam etc. Instead of collecting the finely divided mass immediately on delivery from the machine, it can be scattered over large surfaces by means of the centrifugal force developed. Thereby the drying process is accelerated and in this manner either fine or raw material are obtained. If the fine article (granluated or peat coal) is to be obtained the material must be more quickly raked together, if raw material is desired, the layers are allowed to get thicker.

The grinding devices here described can be applied to the present worm-feed presses or to the present rough-grinding-machines, or they may be located at some distance from them, so that the rough grinding takes place in the present old machines and the material so prepared is fed, in cake or strip, by means of conveyer belts to the particular grinding or like devices.

Before or after grinding chemicals may be added to the raw material, which will hasten the destruction of the colloids present.

The grinding members are so arranged that the raw material, although it has to pass through very small spaces, cannot block up the machine: with the flat grinding members the material is thrown out by centrifugal force, with the cylindrical grinders by the progressive rotation of the cylinder or cylinders.

The product, which is obtained by means of the present invention, dries very quickly and gives a fuel, which is freer of water, of greater heat value, firmer and more convenient in use, than was hitherto obtainable by mechanical treatment of peat and similar bituminous substances. As initial material the peat, or peaty bodies, found in the lower strata, that is the so-called deep peat, is particularly suitable.

By means of the apparatus here described, it is possible to make hard, compact fuel out of peat or peat compositions. This is secured in that the raw peat mass first through mechanical treatment in the manner described above, and then by the addition of chemicals or binding means, is converted into a thick, fluid and viscous state and is then spread out in thin layers. By means of the mechanical treatment a very close structure is obtained and by means of the distribution in layers a very quick drying is effected through the evaporation of the moisture. Since it is not necessary to place any particular substructure beneath these thin layers, the peat field cleared of rubbish or the rubbish turned over, can be used, this being treated with chemicals, so that the upper surface of the peat-field or the reverse side of the cleared rubbish is rendered impermeable to water. This quality of the surface is obtained preferably by a treatment with waterglass. Several layers can be dried one above the other, if a damp layer is placed upon the under layer which is already dry. After the thin layer of peat has dried and hardened, it can be broken off with a suitable tool and loaded as fuel ready for use.

Another constructional form of the apparatus consists in that the mass first mechanically and then chemically treated is forced through suitable shaped pipes, preferably through pipes which are attached to the press itself. By the use of bent pipes attached to a ribbon press, the mass will issue continually in a kind of shaving or spiral form and will heap itself up on the ground in a cone. The advantage of such a spiral structure is great for the drying period, for since the mass falls away from the press in thin ribbons or loose coils, the air and warmth, which effect the drying, can penetrate everywhere and accelerate the latter.

Lastly, objects of a desired kind can be prepared from peat, peat-moss and the like used as a wood substitute, by the apparatus here described. The raw peat, peat-moss or the like, particularly the peaty masses found in the upper strata, that is the so-called "high peat-moss", is ground between grindstones or other similar grinding-members, then if necessary, drying and kneading it together with binding substances or filling material and then shaping it. By means of the grinding of the peat- or like mass, which is preferably effected in a damp condition or even with the addition of water, a considerably finer, more homogeneous and consistent mass is obtained than is usually the case with pulverization or grinding of such materials, and the mass on account of the water contained therein is plastic, and is suitable for the making of objects of every kind, such as picture frames, panelling, and lamp brackets etc. For drying, the peat or like mass can be left to itself in permeable containers until it is quite dry. For carving processes the ground peat mass is preferably shaped into blocks, which after drying may be cut up and carved. Also for panelling and the like blocks may be made which after drying are sawn up into planks and boards. For moulding, the mass is taken from the containers serving for the drying before it has got hard, that is to say, while it is still plastic, is moulded and then dried further. For moulding purposes, the mass is well kneaded during which process binding or filling substances, for example, a distillate of peat, can be added as desired. Instead of or in addition to the binding substance, sulphuric acid, nitric acid and other solvents of colloidal and bituminous substances, and substances which drive away water, may be added. It is also possible to add to the mass wood substances and dyes. To facilitate and cheapen the transport of the raw material, the latter may be dried in a desired manner and loaded at the peat-field, and then at the works be ground and worked into a plastic mass with the addition of sulphuric acid, nitric acid, caustic soda, solvents of bitumen and the like, and further shaped, that is pressed with the addition of filling and binding substances, into objects of every kind.

As raw material peat fragments which have been broken up by frost, heat, and the like, may be used.

If no or but very little filling substance is used, the pressing is preferably effected in two processes; first the plastic mass is pressed in a larger mould, and is then taken out and dried slightly, whereupon the object after partial drying and shrinking is pressed again in the final mould, which is smaller on account of the shrinkage; by these means a very smooth surface and a good cast are obtained.

For the preparation of brown card-board or paper the ground peat is diluted, with or without the addition of the above-mentioned chemicals, and then worked up into card-board or paper in the usual card-board or paper machines.

I claim:

1. A device for producing hard, homogeneous fuel or similar objects from peat, peat-moss, lignite and the like, comprising a conveying device, in combination with a cooperating grinding device, the surface of which is provided with adjustable and elastic rubbing members, said grinding device consisting of rotary bodies in spaced relation to each other, means for keeping the rubbing elements of the different grinding members into cooperation with each other and perforated receiving apertures surrounding the exit opening of the grinding members.

2. A device for producing hard, homogeneous fuel or similar objects from peat, peat-moss, lignite and the like, comprising a conveying device, in combination with a cooperating grinding device, the surface of which is provided with adjustable and elastic rubbing members, said grinding device consisting of rotary bodies in spaced relation to each other, means for keeping the rubbing elements of the different grinding members into cooperation with each other and rotating perforated receiving apertures surrounding the exit opening of the grinding members.

3. A device for producing hard, homogeneous fuel or similar objects from peat, peat-moss, lignite and the like, comprising a pressure-feed channel in combination with a cooperating grinding device, the movable surface of which is provided with adjustable and elastic rubbing members acting upon the other surface.

4. A device for producing hard, homogeneous fuel or similar objects from peat, peat-moss, lignite and the like, comprising a pressure-feed channel in combination with a cooperating grinding device, the surface of which is provided with adjustable and elastic rubbing members, said grinding device consisting of rotary bodies in spaced relation to each other and adapted to act upon each other and to receive the mass between themselves and to finely pulverize the said mass.

5. A device for producing hard, homogeneous fuel or similar objects from peat, peat-moss, lignite and the like, comprising a pressure-feed channel in combination with a cooperating grinding device, the surface of which is provided with adjustable and elastic rubbing members, said grinding device consisting of two members rotating at different speeds and in spaced relation to each other and adapted to act upon each other and to receive the mass between themselves and to finely pulverize the said mass.

6. A device for producing hard, homogeneous fuel or similar objects from peat, peat-moss, lignite and the like, comprising a pressure-feed channel, in combination with a cooperating grinding device, the surface of which is provided with adjustable and elastic rubbing members, said grinding device consisting of rotary bodies in spaced relation to each other and adapted to receive the mass between themselves and to finely pulverize the said mass, and means for pressing the rubbing members against the opposite grinding elements.

7. A device for producing hard, homogeneous fuel or similar objects from peat, peat-moss, lignite and the like, comprising a pressure-feed channel, in combination with a cooperating grinding device, the surface of which is provided with adjustable and elastic rubbing members, said grinding device consisting of rotary bodies in spaced relation to each other and adapted to act upon each other and to receive the mass between themselves and to finely pulverize the said mass, and means for automatically pressing the rubbing members against the opposite grinding elements.

8. A device for producing hard, homogeneous fuel or similar objects from peat, peat-moss, lignite and the like comprising a pressure-feed channel, in combination with a cooperating grinding device, the surface of which is provided with adjustable and elastic rubbing members, acting upon each other, said grinding device consisting of rotary bodies in spaced relation to each other, self-sharpening rubbing blades on said grinding device, and means for keeping the blades of the grinding members into cooperation with each other.

In testimony whereof I have signed my name to this specification.

BOHUMIL JIROTKA